United States Patent
Binder et al.

(10) Patent No.: US 10,575,539 B2
(45) Date of Patent: Mar. 3, 2020

(54) ADDITIVE FOR SELENIUM-CONTAINING FORAGE

(71) Applicant: Erber Aktiengesellschaft, Herzogenburg (AT)

(72) Inventors: Eva-Maria Binder, Tulln (AT); Dian Alexandra Schatzmayr, Tulln (AT); Heidi Elisabeth Schwartz, Vienna (AT)

(73) Assignee: ERBER AKTIENGESELLSCHAFT, Herzogenburg (AT)

( * ) Notice: Subject to any disclaimer, the term of this patent is extended or adjusted under 35 U.S.C. 154(b) by 943 days.

(21) Appl. No.: 14/365,803

(22) PCT Filed: Dec. 10, 2012

(86) PCT No.: PCT/AT2012/000311
§ 371 (c)(1),
(2) Date: Jun. 16, 2014

(87) PCT Pub. No.: WO2013/086548
PCT Pub. Date: Jun. 20, 2013

(65) Prior Publication Data
US 2015/0030726 A1    Jan. 29, 2015

(30) Foreign Application Priority Data
Dec. 14, 2011  (AT) ................. GM670/2011

(51) Int. Cl.
| A23K 10/18 | (2016.01) |
| A23K 20/20 | (2016.01) |
| A23K 20/22 | (2016.01) |
| A23K 20/24 | (2016.01) |
| A23K 10/30 | (2016.01) |

(52) U.S. Cl.
CPC .............. *A23K 10/18* (2016.05); *A23K 10/30* (2016.05); *A23K 20/22* (2016.05); *A23K 20/24* (2016.05); *A23K 20/30* (2016.05)

(58) Field of Classification Search
CPC ........ A23K 20/22; A23K 20/24; A23K 20/30; A23K 10/18; A23K 10/30
See application file for complete search history.

(56) References Cited

U.S. PATENT DOCUMENTS

| 4,508,737 A |   | 4/1985 | Forest et al. |
| 5,786,007 A |   | 7/1998 | Webb |
| 6,045,834 A | * | 4/2000 | Howes ................ A23K 30/00 |
|             |   |        | 426/2 |

FOREIGN PATENT DOCUMENTS

| DE | 1082486 B      |   | 5/1960 |           |
| DE | 102008002013 A1 |   | 12/2008 |          |
| EP | 0043202 A2     |   | 1/1982 |           |
| GB | 2078080 A      | * | 1/1982 | ........... A23K 40/35 |

OTHER PUBLICATIONS

Brian Tarr "Managing the Effects of Molds and Mycotoxins in Ruminants" pp. 1-8, 2006.*
Machine translation of CN101940911A, published Jan. 12, 2011 (Year: 2011).*
Derwent abstract for CN101940911, pulished 2011 (Year: 2011).*
Machine translation of EP1566108A1 description section (Year: 2005).*
Faixová Z et al., "Efficacy of Dietary Selenium to Counteract Toxicity of Deoxynivalenol in Growing Broiler Chickens", Acta Veterinaria Brno, vol. 76, Nr:3, pp. 349-356, Jan. 1, 2007.
Dvorska et al., "Protective effect of modified glucomannans and organic selenium against antioxidant depletion in . . . ", Comparative Biochemistry and Physiology Part C: Toxicology & Pharmacology, Elsevier, US, vol. 145, Nr:4, pp. 582-587, May 1, 2007.
Danicke S et al., "On the effects of a hydrothermal treatment of deoxynivalenol (DON)-contaminated wheat in . . . ", Animal Feed Science and Technology, Elsevier, Amsterdam, NL, vol. 118, Nr:1-2, pp. 93-108, Jan. 3, 2005.

* cited by examiner

*Primary Examiner* — C. Sayala
(74) *Attorney, Agent, or Firm* — Jacobson Holman, PLLC.

(57) ABSTRACT

An additive for selenium-containing forage, primarily comprising plants or plant parts, such as cereal, corn, grass, or alfalfa, including at least one salt detoxifying inorganic trichothecene and/or zearalenone, with an alkali or earth alkali metal sulfite and perhaps a selenium containing salt being included as the inorganic salt detoxifying trichothecene and/or zearalenone.

7 Claims, 4 Drawing Sheets

ADDITIVE FOR SELENIUM-CONTAINING FORAGE

Figure 1:
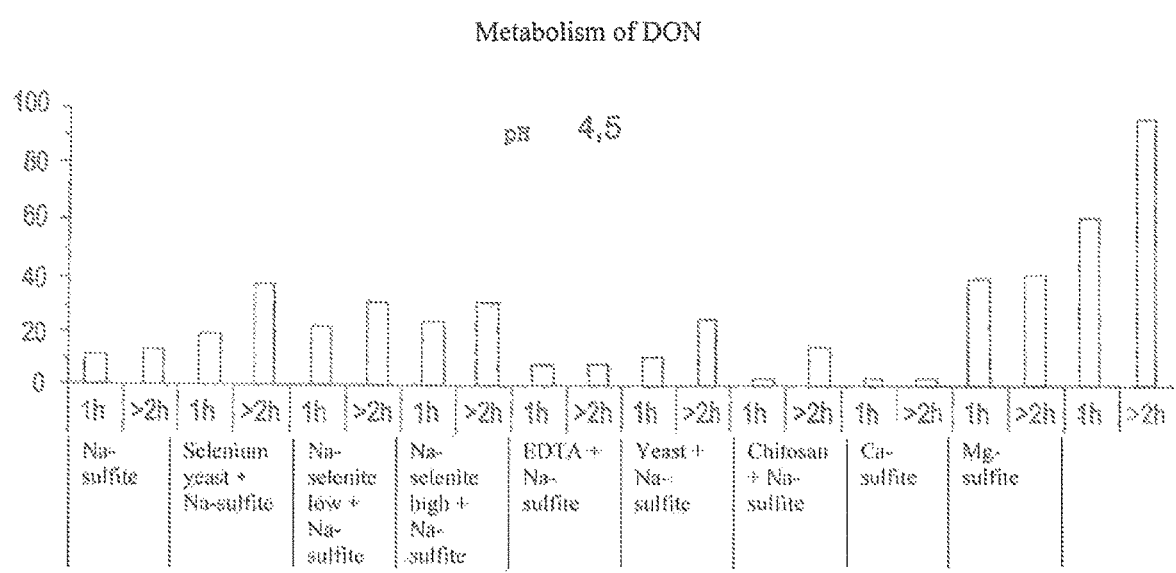

The present invention relates to an additive for selenium-containing forage, primarily comprising plants and/or plant parts, such as cereal, corn, grass, alfalfa, or the like, including at least one inorganic trichotecene and/or zearalenone detoxifying salt.

Additives for forage are known for most different purposes and are widely used, such as for example additives to prevent deficiency symptoms of an animal during breeding, such as vitamin preparations or the like, or also additives which particularly shall increase productivity, as well as finally additives intended for binding and/or neutralizing harmful substances frequently present in forage, particularly present in forage comprising plants and/or plant parts, such as mycotoxins or the like.

In order to detoxify forage for farm animals here, on the one hand, most different substances are known on which the mycotoxins present on forage primarily comprising plants and/or plant parts, such as cereal, corn, grass, alfalfa, or the like are absorbed and/or combined with, particularly bentonite or zeolite being used, which based on the plurality of layers, channels, and pores formed therein show an extremely large, inner surface on which large quantities of harmful substances can be absorbed.

Finally, in recent years it was possible to find specific microorganisms, which are capable of enzymatically metabolizing individual mycotoxins, such as deoxynivalenol.

Another way to remove mycotoxins from forage is the use of yeasts and/or yeast components, such as yeast cell walls, for example, with here mycotoxins being able to combine and/or adhere thereto and thus being rendered harmless.

In addition to the absorption and/or combining of mycotoxins at the surfaces and the enzymatic metabolism of mycotoxins it is however also possible to chemically and/or enzymatically detoxify such mycotoxins by metabolizing or converting them into non-toxic decomposition products or reaction products.

In this context it is discernible particularly from DE 10 2008 002 013 A1 that harvested plant products contaminated with mycotoxins can be detoxified that the such they are used in combination with a preparation comprising at least one oxygen acid deducted from sulfur dioxide or its salts as well as an amine of the formula $NH_2R$ or its salts with the formula $[NH_3—R]^+X^-$. With the use of such a mixture it is possible to decompose mycotoxins, particularly trichothecenes and/or zearalenones, and this way rendering them harmless.

An additive is known from U.S. Pat. No. 4,508,737 A for preserving and controlling the fermentation of silage, which comprises a mixtures of alkali metal sulfites, bisulfites, metabisulfites, and the like.

DE 1082486 B1 also describes an ensiling additive, by which in an anaerobic environment and the addition of primary and secondary alkali metal salts of the sulfuric acid the growth of the lactic acid bacteria shall be supported, supporting the fermenting process.

U.S. Pat. No. 5,786,007 A describes a hinder for the production of forage pellets, with here a mixture of anhydrous salts being added to the forage, and by exposing it to an increased temperature and humidity the compressibility of the pellets is improved.

Here, it has proven disadvantageous in practical applications that combinations of a mono-substituted amine compound and an oxygen acid deducted from sulfur dioxide or its salts must be used, in order to metabolize mycotoxins present on and/or with the forage, particularly the trichothecene, aflatoxins, and/or zearalenones, which renders the composition of the forage and/or the additive relatively complex.

In these methods of prior art for detoxifying forage, primarily comprising plants and/or plant parts, the fact is furthermore disadvantageous that every individual detoxifying substance known in prior art and/or every useful microorganism was able to detoxify and/or combine only one and/or maximally two different mycotoxin families and thus only a very specific application was possible of the substances and/or microorganisms to be applied.

The present invention now targets to provide an additive for selenium-containing forage, primarily comprising plants and/or plant parts, such as cereal, corn, grass, alfalfa, or the like, allowing to simultaneously metabolize and/or immobilize a plurality of such harmful components present in forage, such as particularly mycotoxins.

According to the invention the additive for forage primarily comprising plants and/or plant parts is essentially characterized in that here an alkali or earth alkali metal sulfite and/or a selenium-containing salt are included as an inorganic salt detoxifying trichothecene and/or zearalenone. By structuring the additive such that an alkali or earth alkali metal sulfite and/or a selenium-containing salt are included as the inorganic salt detoxifying mycotoxins it is possible on the one hand to use not only the known, germicidal effect of the sulfite and/or analog or similar selenium-containing salts but it has shown surprisingly that the use of only small quantities of alkali and/or earth alkali metal sulfites has particularly beneficial effects upon the disintegration of mycotoxins from the group of trichothecenes and/or zearalenones. Thus, a relatively small quantity of added inorganic alkali or earth alkali metal sulfite was found sufficient for the disintegration of comparatively large quantities of mycotoxins so that not only an extremely efficiently acting additive is provided, which furthermore can be used directly in a solid form, but the use of this additive also seems sufficient in quantities harmless for subsequent consumption.

Better results are yielded in the facultative use of selenium-containing salts, with here it being assumed that in the present case a catalytic effect is caused by the selenium content of the salts and/or compounds used.

According to a preferred further development the additive is embodied such that a sodium, potassium, magnesium, and/or calcium sulfite is included. The use of any one of the above-mentioned sulfites is not only beneficial for economic reasons, but these compounds are particularly preferred due to their relatively good solubility and workability. Furthermore, the preferred sulfites act additionally as reduction agents so that perhaps additional harmful substances, contained in the forage based on plants and/or plant parts, can be reduced directly into non-toxic substances.

According to a preferred further development of the present invention, the sulfite detoxifying inorganic trichothecenes and/or zearalenones in a quantity of 10 to 100% is included in the additive and/or the additive is made thereof, and it is sufficient to quickly and reliably convert trichothecene and particularly deoxynivalenol into deoxynivalenol sulfonate, which represents a non-toxic metabolite, and/or to detoxify zearalenone.

According to a preferred further development of the invention the additive is embodied such that additionally or instead of the alkali and/or earth alkali metal sulfite as the selenium-containing salt at least one sodium, potassium, magnesium, calcium, selenite is included in the additive.

Due to the fact that at least one sodium, potassium, magnesium, calcium selenite is included in the additive as a selenium-containing salt it is possible, on the one hand, to securely and reliably disintegrate the mycotoxins into their non-toxic metabolites and, on the other hand, simultaneously to provide the important micronutrient selenium in sufficient quantities so that overall higher productivity is yielded in the animals fed therewith, which can be yielded exceeding the total effect of a single administration of selenium or the detoxification of the mycotoxins.

According to a preferred further development of the invention, by furthermore including another selenium-containing, compound in the additive, such as a selenium yeast, it is achieved, particularly in addition to the advantageous effects of selenium in the additive, to provide a yeast at which mycotoxins, such as zearalenone can be absorbed, so that an even more complete detoxification can be achieved of the forage treated with the additive.

According to a preferred further development of the present invention the additive is embodied such that selenium is provided in a ready-to-eat forage in a concentration of no more than 0.5 ppm, preferably no more than 0.2 ppm. By adjusting the selenium concentration to a maximum of 0.5 ppm it is ensured that, on the one hand, the micronutrient selenium is provided in sufficient quantities, and on the other hand, excess quantities, which in turn might show negative effects, are securely avoided. For this purpose, for example the additive is embodied such that mixtures of alkali or earth alkali metal sulfites and for example selenium yeast are used, yielding an additional, preferred effect such that the yeast included in the additive binds in a manner known per se perhaps other mycotoxins contained in the forage and thus can render them harmless.

For a further improvement of the combining and/or absorption of mycotoxins contained in forage and/or in order to additionally provide in the forage additive substances beneficial and/or performance enhancing in animals the additive according to the invention is further developed such that furthermore a solid carrier is selected from one or more substance(s), such as a naturally occurring or modified silicate mineral, such as smectite, montmorillonite, saponite, kaolinite, vermiculite, illite, sepiolite, attapulgite, zeolite, klinoptilolite, and/or compounds containing silicate-mineral, such as bentonite, diatonite, and/or biopolymers, such as chitosan or mannanoligo-saccharide. Surprisingly, by a targeted selection of an inorganic carrier on a silicate basis, it is possible to securely and reliable absorb the reaction products formed of deoxynivalenol formed by the addition of alkali and earth alkali sulfites, and by the selection of potentially useful biopolymers used as carriers to yield an even further increase in productivity in animals, which were fed with the additive according to the present invention.

According to a preferred further development of the present invention, by the additive being embodied such that the solid carrier is included in a quantity from 90% to 5% of the additive it is possible to ensure an arbitrary adjustment of the additive to the intended purpose, such as to cases in which in addition to an effective decontamination of mycotoxins and/or a disintegration thereof also a certain, targeted content of nutrients shall be provided.

In order to additionally ensure preventing any contamination of the forage, mixed with the additive according to the invention, with zearalenon said additive is preferably further developed such that furthermore selenium-tree yeasts and/or yeast cell walls or yeast cell wall components are included. By additionally included selenium-free yeasts and/or yeast cell walls or yeast cell wall components it is not only possible to achieve a secure absorption of zearalonene but surprisingly, in addition to the above-described synergistic effect, a combining of the disintegration products is yielded, particularly of the deoxynivalenol-sulfonates, so that an even further increased productivity can be observed of the animals supplied with the forage additive according to the invention.

Here, it has proven beneficial that, according to a preferred further development of the invention, the selenium-free yeasts and/or yeast cell walls or yeast cell wall components are included in a quantity from 80% to 10% so that the absorption can be ensured of the deoxynivalenol-sulfonates as the reaction products formed.

Surprisingly it has shown, when the invention is further developed preferably such that the additive comprises sodium sulfite as a salt detoxifying inorganic trichothecene and/or zearalenone as well as additionally katalytic quantities, particularly comprising a selenium yeast at a concentration from 2 and/or 20 percent by weight, the effect of the inorganic salt detoxifying the trichothecenes and/or zearalenone can be amplified, which is caused by a catalytic effect of the added selenium yeast because still an almost unchanged concentration of selenium can be shown after all mycotoxins in a final forage were metabolized.

A particularly complete removal of trichothecene is achieved, such as deoxynivalenol or aflatoxin and zearalenone in forage when the additive is preferably embodied such that it comprises 25 to 93% by weight sodium sulfite, 2 to 20% by weight selenium yeast, as well as 5 to 73% by weight bentonite as the carrier. In order to ensure that a homogenous detoxification of all mycotoxins potentially included in forage is achieved, the additive is preferably further developed such that it is used as a homogenous, finely milled powder. If such a finely milled powder is mixed under the forage it is ensured that the mycotoxins present in the entire forage are metabolized evenly either by way of reduction into harmless components or by being absorbed at the surface of the other adsorbents included in the additive and thus they cannot be metabolized any longer.

Surprisingly, it could be shown that, according to a preferred further development of the invention, the forage additive can be used for increasing the performance of farm animals. Here, the increased performance is caused on the one hand by the detoxification and/or the absorption of the mycotoxins present on the forage, and on the other hand on the fact that the additionally beneficial substances contained in the forage additive, such as yeasts and the like, can also contribute to an increased performance.

According to a preferred further development the forage additive according to the invention is used for detoxifying trichothecene, particularly deoxynivalenol, and T2-toxin, and/or zearalenon.

In the following the invention is implemented based on metabolism tests using various alkali and/or earth alkali metal sulfites as well as perhaps selenium yeasts on corn contaminated with deoxynivalenol.

Here, corn grist with different natural water contents and various initial concentrations of deoxynivalenol (DON) and acetyldeoxynivalenol (AcDON) is mixed with different concentrations of alkali and/or earth alkali metal sulfite.

Figure 2:
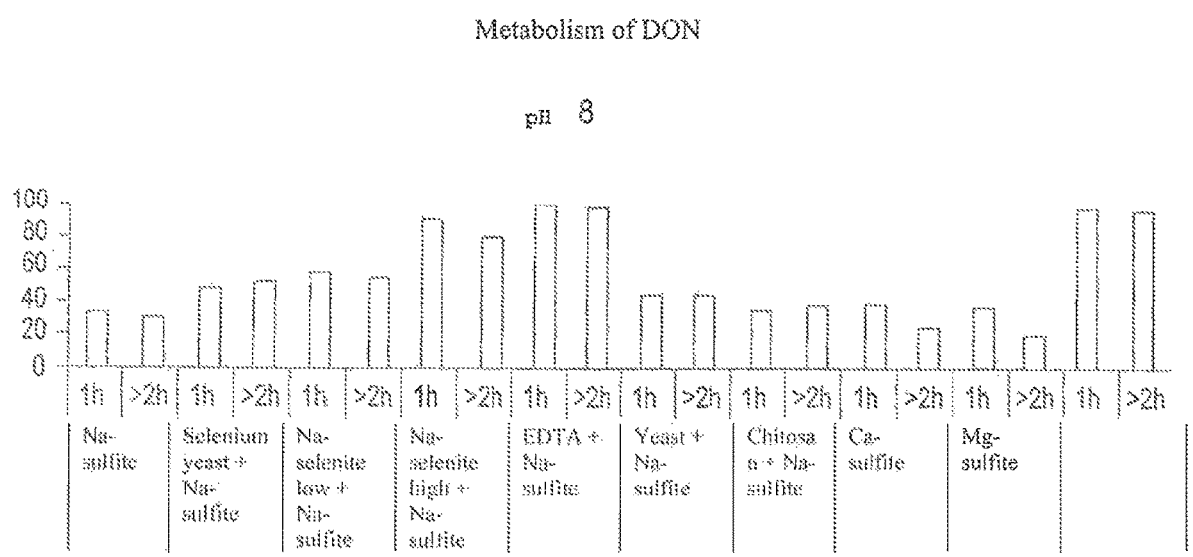
Figure 3:
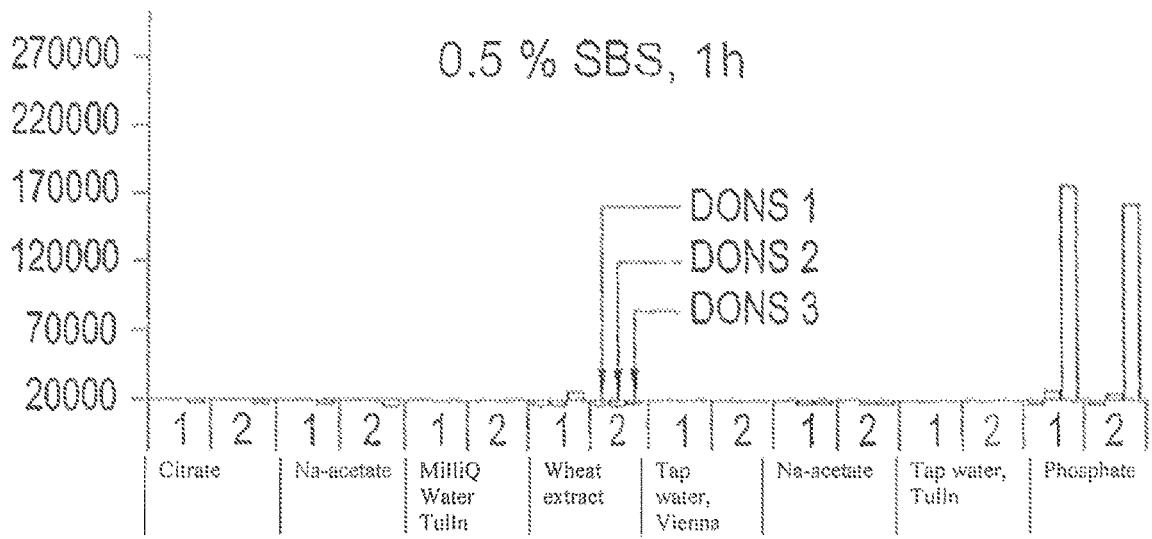
Figure 4:
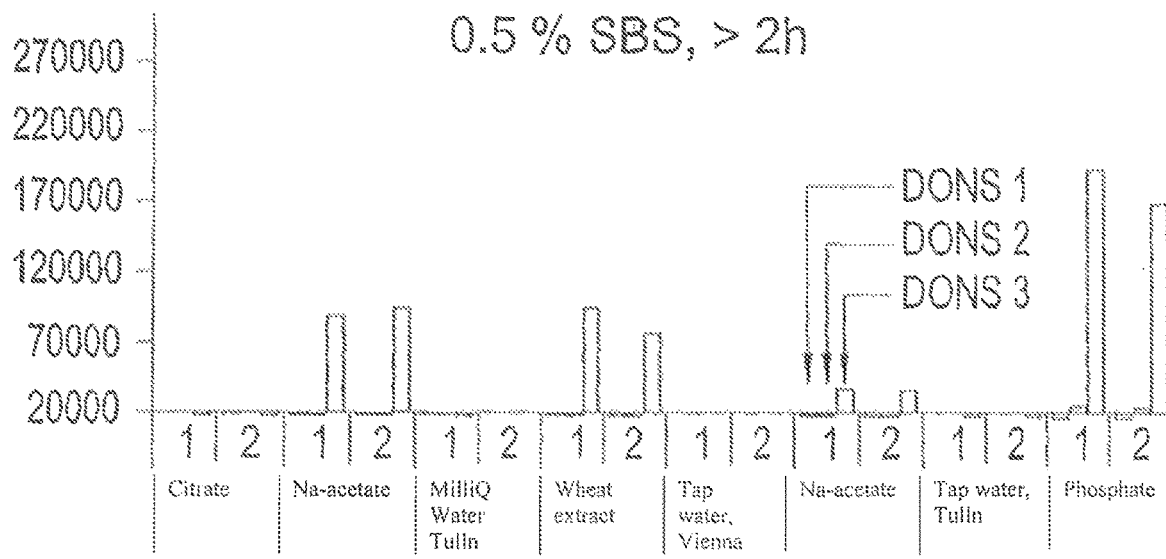
Figure 5:
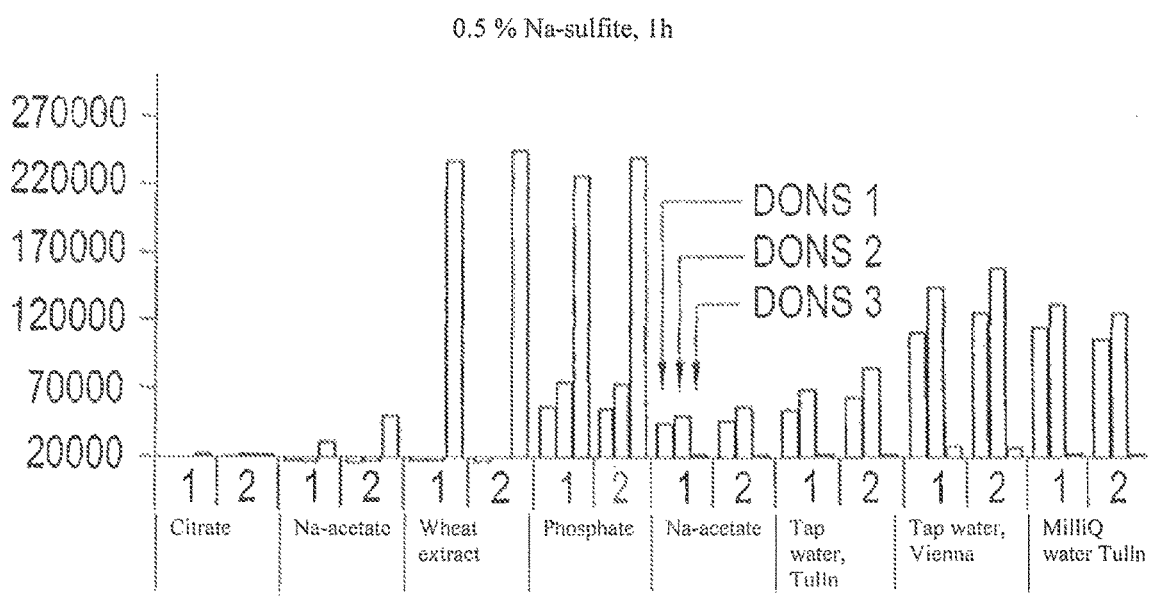

The results are shown in the following tests and figures. Here it shows:

FIG. 1 a metabolism diagram of deoxynivalenol (DON) in forage at pH 4.5,

FIG. 2 an analog metabolism diagram of deoxynivalenol in forage at pH 8,

FIG. 3 a diagram of the metabolism products of deoxynivalenol formed after 1 h in various samples with 0.5% sodium bisulfite, FIG. 4 a diagram of the metabolism products of deoxynivalenol formed after 2 h in various samples with 0.5% sodium bisulfite, FIG. 5 a diagram of the metabolites of deoxynivalenol formed after 1 h in various samples with 0.5% sodium sulfite.

Figure 6:
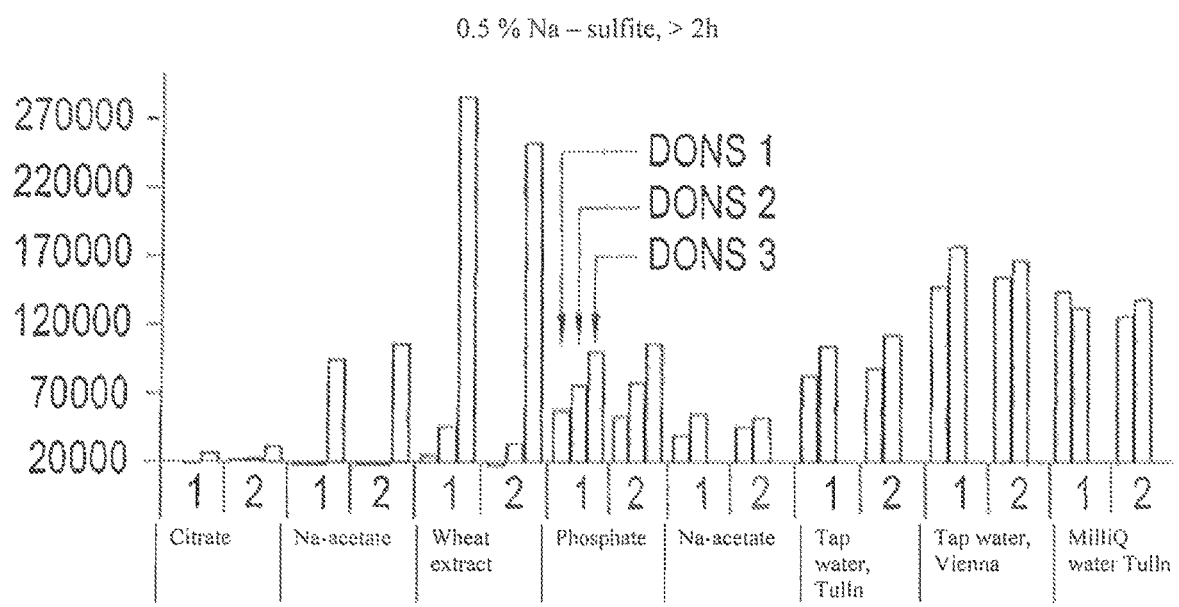

FIG. 6 a diagram of the metabolites of deoxynivalenol formed after 2 h in various samples with 0.5% sodium sulfite.

EXPERIMENT 1

Corn grist with 6% humidity, neutral pH-value, 23.0 ppm DON, and 3.1 ppm AcDON as the initial concentration, as well as 1% sodium sulfite is measured respectively twice after an incubation period of 24 h at different temperatures. It is discernible in Table 1 that after 24 h at room temperature (25° C.) a reduction of the initial concentration of DON and/or AcDON can be achieved by 64% and 67%, respectively, and while an execution of the same test at 60° C. essentially shows no change of the reduction in reference to room temperature. In detail, here within two repeated tests, reductions of the initial toxin can be yielded by 63% and 75% respectively.

TABLE 1

| | Room temperature | Room temperature | 60° C. | 60° C. |
|---|---|---|---|---|
| Sulfite treatment (1% Na-sulfite) | 67 | 64 | 63 | 75 |

An analog test (two repetitions) was performed with 1% sodium sulfite added for an extended incubation period, with here, as discernible from Table 2, after an incubation period of 48 hours at room temperature (2.5° C.) a reduction could be yielded by 54% and 61%, respectively, while at an increased temperature of 60° C. a reduction could be yielded of the initial toxin concentration by up to 83%.

TABLE 2

| | Room temperature | Room temperature | 60° C. | 60° C. |
|---|---|---|---|---|
| Sulfite treatment (1% Na-sulfite) | 54 | 61 | 83 | 57 |

In another experiment, corn grist with 13.5% humidity and a neutral pH-value as well as an initial concentration of 14.8 ppm DON was subjected twice to a sodium sulfite treatment with 0.2% sodium sulfite, with it showing here that within the first 24 h a reduction could be yielded by 46% and that at an extended storage period of the corn grist up to 7 days under identical conditions (such as temperature, relative humidity) at 25° C. the concentration of DON is reduced, disintegrated to approximately 76% of the initial concentration of the toxin.

TABLE 3

| | 24 h | 48 h | 7 d |
|---|---|---|---|
| Sulfite treatment (0.2% Na-sulfite) | 46 | 65 | 76 |

Finally, once more corn grist with 13.5(%) humidity and an initial concentration of 23.0 ppm DON was subjected, with two repetitions each, to a treatment with 0.5% sodium sulfite as well as selenium yeast, with the selenium yeast comprising 2000 ppm selenium. It is discernible from Table 5 that as early as directly after mixing the corn grist with the forage additive 69% to 71% of the initial concentration of the DONS contained in the forage additive is reduced and/or metabolized and that after 24 h the value was maintained essentially constant, and here clearly a synergistic effect can be deducted between the alkali metal sulfite and the selenium yeast and/or a catalytic effect of the selenium yeast.

TABLE 4

| | 0.5 h | 0.5 h | 24 h | 24 h |
|---|---|---|---|---|
| 0.5% Na-sulfite 0.005% selenium yeast | 69 | 71 | 72 | 75 |

Finally, in a storage experiment piglet forage comprising 0.1% sodium sulfite and/or 0.1% magnesium sulfite was examined for the reduction of the mycotoxin concentration. As discernible from Table 6, considerably better results could be yielded with sodium sulfate, namely both with regards to deoxynivalenol (DON) as well as regarding Ac-DON and also in respect to zearalenon (ZON) compared to a treatment with magnesium sulfite.

TABLE 5

| | DON | Ac-DON | ZON |
|---|---|---|---|
| MT concentration at the outset (ppm) | 34.159 | 1.206 | 0.136 |
| Na-sulfite, 2 days | 21.399 | 1.076 | 0.85 |
| Mg-sulfite, 2 days | 30.071 | 1.034 | 0.95 |
| Na-sulfite, 5 days | 19.525 | 0.502 | 0.90 |
| Mg-sulfite, 5 days | 26.398 | 0.722 | 0.96 |

Summarizing it can be stated that by adding small quantities of inorganic alkali and/or earth alkali metal sulfites as well as perhaps selenium-containing substances, such as selenium yeast, a considerable reduction of the mycotoxin concentration can be yielded in the forage without here it being required to add further additives and/or artificial moisture.

EXPERIMENT 2

In an in vitro-experiment it was attempted to decontaminate forage samples contaminated with deoxynivalenol using different additives and/or mixtures of additives according to the invention.

In detail, 10 g forage sample charged with deoxynivalenol comprising corn grist is filled into a sample vial and mixed with an aqueous 0.05% sodium sulfite solution showing a pH-value of 4.5. It is discernible in FIG. 1 that after 1 h approximately 13% of the deoxynivalenols contained therein was detoxified and after a period of more than 2 h approximately 16% thereof. When a sample showing the same concentration of deoxynivalenol is treated with a slurry comprising 0.05% sodium sulfite and 0.05% by weight selenium yeast, after 1 h approximately 20% of the desoxynivalenol is metabolized and after more than 2 h approximately 40%. Analog tests were each performed with 0.05% sodium sulfite and sodium selenite, sodium sulfite and EDTA, sodium sulfite and yeast, sodium sulfite and chitosan, calcium sulfite, and magnesium sulfite added thereto. The best results are yielded here, in addition to the combination of sodium sulfite and selenium yeast, with sodium sulfite and magnesium sulfite, with here after only 1 h it being possible to observe a reduction of the deoxynivalenol comprised in the sample by 40%.

An analog experiment with identical concentrations of deoxynivalenol, sodium sulfite, and the other additives listed was performed at a pH-value of 8, with here it showing that particularly when the additive is inserted in a neutral or slightly basic environment an extremely rapid disintegration of the deoxynivalenol can be observed, with surprisingly in the basic environment the best results being achieved with sodium sulfite and ETDA and/or sodium sulfite and sodium selenite, in which, as shown in FIG. 2, with sodium sulfite and EDTA a 100% chemical conversion of deoxynivalenol can be achieved and with sodium sulfite and sodium selenite more than 90% of the deoxynivalenol is converted already after 1 h.

Thus, it is discernible from FIGS. 1 and 2 that, according to a preferred embodiment of the present invention, the forage additive can be mixed directly into the forage and here, detoxification of the forage occurs directly, without it being necessary for such enriched forage to be consumed by an animal and/or before it is consumed.

EXPERIMENT 3

This experiment shows a comparison of the potential disintegration between sodium sulfite and the sodium bisulfite already used in prior art based on most different samples comprising deoxynivalenol.

From FIGS. 3 and 4, which show the effect of sodium bisulfite (SBS) upon various samples after 1 h and/or 2 h, it is clearly discernible that sodium bisulfite shows an effect only in phosphatic-buffered samples within 1 h, while after 2 h at least in sample comprising sodium acetate, wheat extract, and phosphate buffer remarkable amounts of deoxynivalenols were disintegrated to DONS3, with its structure presently not being known.

When in analog samples, however here using, 0.5% sulfite instead of 0.5% sodium metabisulfite, it shows as discernible in FIGS. 5 and 6 that particularly in the samples comprising wheat extract and phosphate essential amounts of DONS 3 have formed already after 1 h, just as in the samples comprising tap water considerable amounts of metabolites have developed, namely DONS1 and DON2, which are ray longer toxic, either. When this experiment is continued over a period of 2 h it is discernible that in samples containing wheat-extract sodium sulfite is capable to disintegrate the entire content of deoxynivalenol into harmless metabolites, namely particularly DONS3.

In detail, it is known that the metabolites DONS1 and DONS2 represent deoxynivalenol sulfonates and/or ketals, while probably DONS3 as well as DONS2 represent a C-15ketal, with its structure however not being completely clarified at this point of time.

In summary it is discernible that sodium sulfite, compared to the sodium bisulfite of prior art, disintegrates deoxynivalenol considerably faster and more completely, namely converting it into particularly three disintegration, while during the metabolism with sodium sulfite, if at all, only one metabolite, namely DONS3 can be found.

EXPERIMENT 4

In feeding experiments the effect of a sulfite-containing forage additive was examined for forage contaminated with mycotoxines for feeding piglets.

For this purpose in the test groups approx. 20% of the corn was replaced by contaminated corn. 150 piglets (approx. 4 weeks old, average weight 8.33 kg) were individually weighed and divided into four groups with similar average weight. 30 piglets, with their individual weight deviating too much from the mean weight, were segregated.

Mycotoxin concentration of the forage:
2.4 ppm deoxynivalenol (DON)
0.4 ppm acetyl-DON
0.24 ppm zearalenon
4 groups were respectively given either:
A—sodium sulfite+yeast
B—sodium sulfite
C—control
D—sodium sulfite+selenium yeast
Live weight (kg) and mortality (number)

|  | NaS + yeast | Na - sulfite | Control | NaS + SeH |
| --- | --- | --- | --- | --- |
| Number of animals | 30 | 30 | 30 | 30 |
| Initial weight | 8.3 | 8.29 | 8.30 | 8.3 |
| Weight day 14 | 10.9 | 10.91 | 9.97 | 11.19 |
| Weight day 28 | 16.48 | 15.94 | 14.31 | 16.71 |
| Weight day 42 | 25.30 | 24.74 | 22.10 | 25.61 |
| Mortality (number) | 0 | 0 | 1 | 0 |

Feed Conversion

|  | NaS + yeast | Na - sulfite | Control | NaS + SeH |
| --- | --- | --- | --- | --- |
| Day 1-14 | 1.66 | 1.74 | 1.76 | 1.76 |
| Day 15-28 | 1.81 | 1.71 | 1.75 | 1.91 |
| Day 1-28 | 1.76 | 1.76 | 1.89 | 1.86 |
| Day 15-42 | 1.90 | 1.91 | 1.93 | 1.91 |
| Day 29-42 | 1.96 | 1.98 | 2.03 | 1.91 |
| Day 1-42 | 1.78 | 1.78 | 1.83 | 1.86 |

Sodium sulfite alone improved the performance with regards to weight development in reference to the control group, which received forage contaminated with mycotoxins without any deactivating additives. In combination with barm as well as selenium yeast here the detoxifying effect could be improved even further, as already shown in the in vitro experiments.

EXPERIMENT 5

In another feeding experiment the effect of various additives, comprising at least one alkali or earth alkali metal sulfite, was examined in piglet breeding.

125 wearier pigs of the breed Ö-HYB-F1 [(land race× large white×Pietrain] (mixed sex, approx. 4 weeks old, average weight approx. 8.62 kg) were marked, weighted, the heaviest and lightest animals were removed and the other ones were divided into 12 sty units of 9 animal each, with the average weight per sty being kept as equal as possible and three sties each were combined to a test group.

The 4 test groups with 27 piglets each received, within the scope of a 2-phase feeding concept, from day 1-14 starter forage and starting day 15 a breeding forage, with once daily forage was provided ad libitum. The corn ratio of the forage was covered by 2 batches of corn grist, naturally contaminated with mycotoxins.

Concentration of mycotoxin:
Phase 1: 0.8 ppm T-2 toxin, 0.22 ppm HT-2 toxin
Phase 2: 2.6 ppm DON

|  | Na-Sulfite + selenium yeast | Control | Na-sulfite | Na-sulfite + Na-selenite (0.5 ppm) |
| --- | --- | --- | --- | --- |
| Number of animals | 27 | 27 | 27 | 27 |
| Initial weight | 8.80 | 8.80 | 8.80 | 8.83 |
| Weight day 14 | 11.23 | 10.99 | 11.29 | 11.27 |
| Weight day 42 | 26.95 | 25.97 | 26.44 | 27.76 |
| Weight day 56 | 38.60 | 36.36 | 38.19 | 39.19 |
| Mortality (number) | 1 | 2 | 1 | 0 |

Feed Conversion

|  | Na-Sulfite + selenium yeast | Control | Na-sulfite | Na-sulfite + Na-selenite (0.5 ppm) |
| --- | --- | --- | --- | --- |
| Day 1-14 | 1.59 | 1.72 | 1.67 | 1.74 |
| Day 15-42 | 1.70ab | 1.85a | 1.67b | 1.68b |
| Day 1-42 | 1.69ab | 1.83a | 1.67b | 1.68ab |
| Day 15-56 | 1.77 | 1.87 | 1.74 | 1.77 |
| Day 29-56 | 1.86 | 1.90 | 1.83 | 1.90 |
| Day 1-56 | 1.75 | 1.86 | 1.73 | 1.77 |

The effectiveness of sodium sulfite could be further improved by the addition of selenium yeast or sodium selenite.

The invention claimed is:

1. A trichothecene or zearalenone detoxifying additive for selenium-containing forage comprising plants or plant parts of cereal, corn, grass, or alfalfa, the additive consisting of:
    sodium sulfite in an amount of 25% to 93% by weight of the additive;
    a selenium yeast in an amount of 2% to 20% by weight of the additive;
    a selenium-containing salt; and
    bentonite as a solid carrier in an amount of 5% to 73% by weight of the additive.

2. The additive according to claim 1, wherein the selenium-containing salt is sodium, potassium, magnesium, or calcium selenite.

3. A trichothecene or zearalenone detoxifying additive for selenium-containing forage comprising plants or plant parts of cereal, corn, grass, or alfalfa, the additive consisting of:
    sodium sulfite;
    a selenium yeast in an amount of 0.2% to 20% by weight of the additive;
    yeasts free from selenium or yeast cell walls or yeast cell wall components,
    a selenium-containing salt; and
    a solid carrier.

4. The additive according to claim 3, wherein the yeasts free from selenium or yeast cell walls or yeast cell wall components are included in a quantity from 10% to 80% by weight.

5. The additive according to claim 1, wherein the additive is used as a homogenous, finely milled powder.

6. A method for increasing productivity in farm animals comprising the step of administering the additive according to claim 1 to the farm animals, wherein effect of the inorganic salt detoxifying the trichothecenes or zearalenone is amplified, which is caused by a catalytic effect of the selenium yeast wherein concentration of the selenium yeast remains unchanged after all mycotoxins in a final forage are metabolized.

7. A method for detoxifying deoxynivalenol, T2-toxins, or zearalenones comprising the step of adding the additive according to claim 1 to plants prone to being subject to deoxynivalenol toxication, T2-toxins toxication, or zearalenones toxication, wherein effect of the inorganic salt detoxifying the trichothecenes or zearalenone is amplified, which is caused by a catalytic effect of the selenium yeast wherein concentration of the selenium yeast remains unchanged after all mycotoxins in a final forage are metabolized.

* * * * *